United States Patent [19]

Ostermiller

[11] Patent Number: 4,582,017
[45] Date of Patent: Apr. 15, 1986

[54] NUMBER 1 BUMPER FLAG

[76] Inventor: Terry Ostermiller, Rt. 1, Box 142, Gering, Nebr. 69341

[21] Appl. No.: 577,576

[22] Filed: Feb. 6, 1984

[51] Int. Cl.⁴ ............................................. B60R 13/04
[52] U.S. Cl. ..................................... 116/28 R; 40/591
[58] Field of Search ................ 116/28 R, 173; 40/591

[56] References Cited

U.S. PATENT DOCUMENTS

| | | | |
|---|---|---|---|
| 1,270,813 | 7/1918 | Gowen | 116/173 |
| 2,074,250 | 3/1937 | Bone | 40/591 |
| 2,093,951 | 9/1937 | Bosket | 116/173 |
| 3,091,215 | 5/1963 | Kenmore | 116/173 |
| 3,540,685 | 11/1970 | Gualano | 116/173 |
| 3,643,902 | 2/1972 | Gualano | 116/173 |
| 3,766,854 | 10/1973 | Scarlet | 116/173 |
| 3,791,337 | 2/1974 | Schamblin | 40/591 |
| 4,091,553 | 5/1978 | Glennie | 116/173 |
| 4,158,925 | 1/1979 | Gagnon | 40/591 |

*Primary Examiner*—Robert I. Smith
*Assistant Examiner*—Denis E. Corr

[57] ABSTRACT

This invention is a sporting events flag, that includes a fabric flag attached to a flagstaff shaped like numeral "1", and a structure for supporting it, in use, on an automobile.

3 Claims, 3 Drawing Figures

NUMBER 1 BUMPER FLAG

This invention relates generally to sporting events novelties. More specifically, it relates to pennants and flags.

It is well known that, in a sports event that attracts large audiences, many of such observers, in their enthusiasm for a particular sport player or team, display flags that may be carried in the hand at the event, or which they may wave from an automotive vehicle.

It is an object of the present invention to provide a flag for use at sports events, and which is readily and quickly attachable to an automotive vehicle, so that the flag is best positioned for a prominent display.

Other objects are to provide a flag for use at sports events, which is simple in design, inexpensive to manufacture, rugged in construction, easy to use, and efficient in operation.

These, and other objects, will be readily evident, upon a study of the following specification, and the accompanying drawing, wherein.

Figures 1, 2, 3:
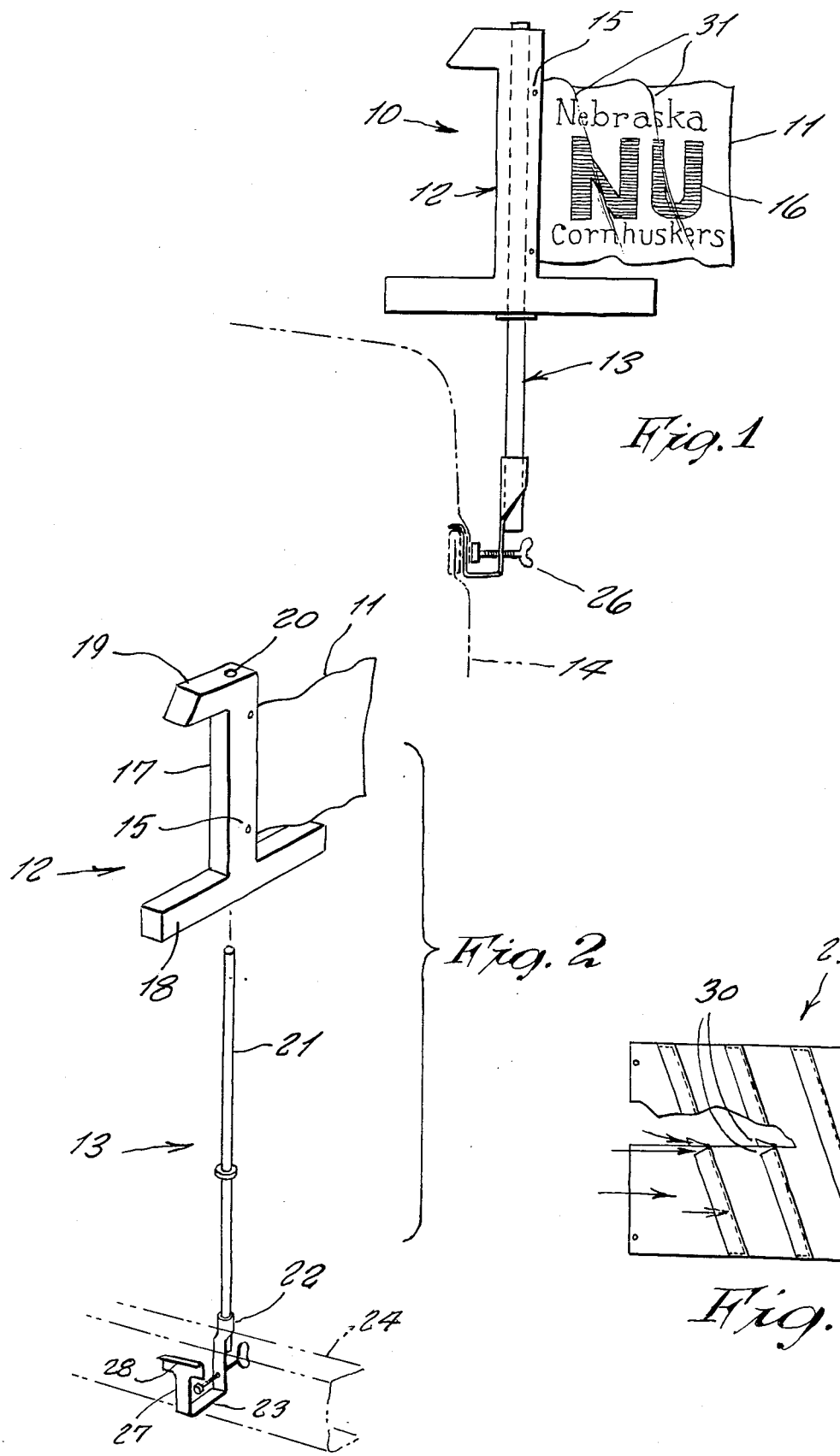
FIG. 1 is a side elevation view of the invention, shown installed on an automobile.
FIG. 2 is a perspective view of the components thereof.
FIG. 3 is a side elevation view, showing a modified flag construction, which causes it to have attractive rippling waves when it flies, as shown in FIG. 1.

Referring now to the drawing in greater detail, and more particularly to FIGS. 1 and 2 thereof, at this time, the reference numeral 10 represents a Number 1 Bumper Flag, according to the present invention, wherein there is a flying flag 11, attached to a flagstaff 12, that is supported upon a superstructure 13, mountable on an automotive vehicle 14.

The flag is made of a durable woven fabric material, so that it withstands the strong force of a whipping wind, when the automobile is traveling fast. It may be made rectangular or tapering pennant-shaped, and having one straight side edge, along which it attaches to the flagstaff by any suitable means, such as rivets 15, or the like. A name, slogan or emblem 16 is printed on both sides of the flag of a particular team or players, being printed in their specific colors.

The flagstaff may be made of any suitable material, such as wood, plastic or metal, and is in the shape of a numeral "1", including a vertical shaft 17, long horizontal base bar 18 and a horizontal spur 19 at the top of the shaft. A vertical hole 20, through the shaft, serves to receive a steel post 21 of the supporting superstructure.

The superstructure includes a flange along the post, so that the bottom of the flagstaff rests thereupon. A lower end of the post is received in a sleeve 22 of a clamp 23, that is removably attachable either to the automobile bumper 24 or to a lip of the trunk compartment lid 25, by means of a wing bolt 26. The clamp end jaw 27 fits between the trunk lid downward lip and the car body upward lip of the trunk compartment opening; a horizontal end flange 28 preventing the post from tilting over sidewardly.

In use, the flagstaff is free to be pivoted on the post by the wind force on the flag. The flag is prominently positioned high enough for display in all directions.

In a modified design of flag 29, shown in FIG. 3, angular pockets 30 are sewn on both sides of the flag, for catching the wind, so as to cause the flying flag to have rippling waves 31, as shown in FIG. 1, for more pleasing attraction. The pockets may be directly on opposite sides of each other, on both sides of the flag, as shown, or they may be staggered therebetween.

While various changes may be made in the detail construction, it is understood that such changes will be within the spirit and scope of the present invention, as is defined by the appended claims.

What I now claim is:

1. A cheering ornament, comprising, in combination, a flag of fabric material, a numeral "one"-shaped flagstaff through which there is a vertical hole and to which the flag is attached, and a superstructure for supporting the flagstaff, and which clampable on an automotive vehicle; said superstructure comprising a post with a flange about said post and a clamp at a lower end of said post, for attachment to either a bumper or a trunk compartment lid of said vehicle to hold said post; said clamp having a vertical end jaw with a horizontal end flange to prevent the post from tilting over sidewardly; the numeral "one" shaped flagstaff pivotally mountable about said post and on said flange; said flag being printed with a name, slogan or emblem of a sport player or team, and said flag having a plurality of angularly extending, wind catching pockets on opposite sides thereof for ripple waving said flag.

2. The combination as set forth in claim 1, wherein said pockets on said flag opposite sides are directly opposite each other.

3. The combination as set forth in claim 1, wherein said pockets on said flag opposite sides are staggered therebetween.

* * * * *